Aug. 20, 1935. H. L. MALCOM ET AL Re. 19,672

BEET HARVESTER

Original Filed Aug. 25, 1931 4 Sheets-Sheet 1

Witness
H. Woodard

Inventor
H. L. MALCOM
H. S. HARKER

By H. B. Willson & Co
Attorneys.

Aug. 20, 1935. H. L. MALCOM ET AL Re. 19,672

BEET HARVESTER

Original Filed Aug. 25, 1931 4 Sheets-Sheet 2

Witness
H. Woodard

Inventors
H. L. MALCOM
H. S. HARKER
By H. B. Willson & Co
Attorneys.

Aug. 20, 1935. H. L. MALCOM ET AL Re. 19,672

BEET HARVESTER

Original Filed Aug. 25, 1931 4 Sheets-Sheet 3

Inventors

H. L. MALCOM
H. S. HARKER

By H. B. Willson & Co
Attorneys.

Witness
H. Woodard

BEET HARVESTER
Original Filed Aug. 25, 1931 4 Sheets-Sheet 4
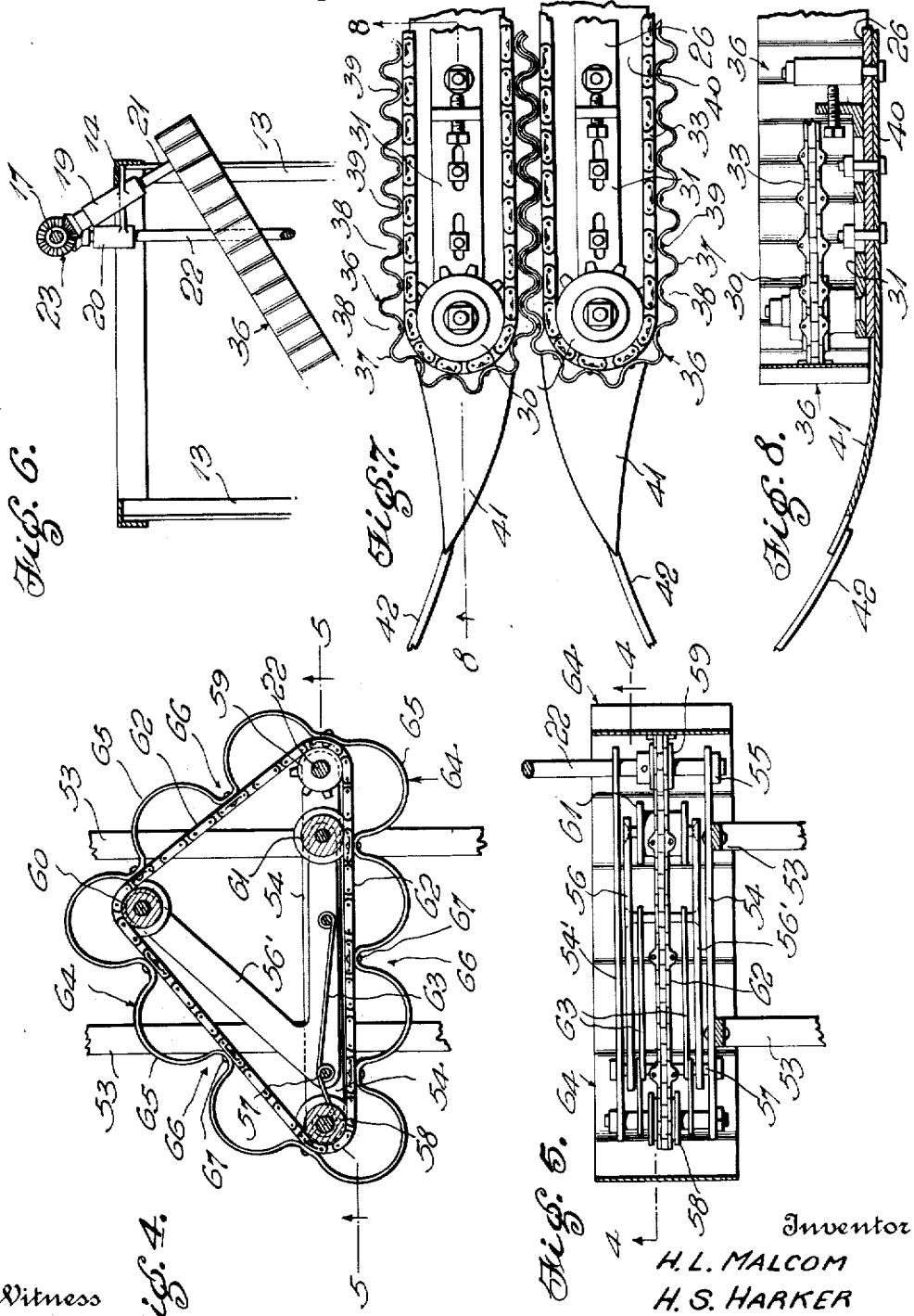
Witness
H. Woodard
Inventor
H. L. MALCOM
H. S. HARKER
By H. B. Willson & Co
Attorneys.

Reissued Aug. 20, 1935 Re. 19,672

UNITED STATES PATENT OFFICE 19,672

BEET HARVESTER

Henry L. Malcom and Hyrum S. Harker, Shelley, Idaho, assignors of forty per cent to said Malcom, twenty per cent to said Harker, twenty per cent to Edgar Duke, Idaho Falls, Idaho, and twenty per cent to Walker Stull Wright, Shelley, Idaho Original No. 1,880,324, dated October 4, 1932, Serial No. 559,318, August 25, 1931. Application for reissue February 24, 1934, Serial No. 712,858

14 Claims. (Cl. 55—108)

The invention relates to a new and improved machine for harvesting beets, and said machine is preferably in the form of a trailer for a digger which loosens the beets but leaves them standing more or less upright in the earth, and due to the provision of novel construction and unique relations of elements, the following operations are performed upon the loosened beets with complete success. The tops of the beets are condensed transversely of the row and guided between two endless top-gripping conveyors, and any beets standing too high for passage otherwise under said conveyors, are depressed to the required extent. The beets are conveyed rearwardly and upwardly by the conveyors and presented to cutting means which cuts the tops from the beets, and by means of beet-positioning tracks under the rear portions of said conveyors, the beets are positioned at a uniform elevation for top cutting. Beet-gripping conveyors under the positioning tracks hold the beets vertically and slide them rearwardly along said tracks until the tops are severed, and the beets and tops may be discharged laterally of the machine or otherwise. The beets are uninjured and hence are readily acceptable to sugar refineries and the like, and the tops are also intact and form valuable stock feed.

To provide a machine which would successfully perform the required operations, whereas numerous others have failed, has of course, been our primary object, and in attaining this end, further aims have been to provide for adequately depressing any loosened beets which could not otherwise pass under the beet top-gripping conveyors; to provide these conveyors in such form as to yieldably grip the beet tops with sufficient force to elevate the beets, yet with a force which would allow sliding of the tops between the conveyors without injury while the beet-positioning tracks and the beet-gripping conveyors were presenting the beets to the top cutting means; to provide the aforesaid beet-gripping conveyors of such form that they would effectively perform their duties with beets of various sizes without injury thereto; to provide the aforesaid beet-positioning tracks as continuations of two longitudinal metal strips beneath which the beets are conveyed upwardly and rearwardly from the ground; to provide novel connecting means between the above mentioned "trailer" and the digger, capable of allowing advantageous relative adjustments and pivotal movements thereof, and to provide a machine which would not entail prohibitive expense for manufacture and maintenance.

With the foregoing in view, the invention resides in the novel subject matter hereinafter described and claimed, description being accomplished by reference to the accompanying drawings.

Fig. 4 is an enlarged horizontal sectional view through one of the beet conveyors used for rearwardly sliding the beets along the tracks which dispose them at a uniform elevation for top cutting, this view being cut substantially on line 4—4 of Fig. 5.

Fig. 5 is a vertical sectional view substantially on line 5—5 of Fig. 4.

Fig. 6 is a fragmentary vertical longitudinal section, as indicated by line 6—6 of Fig. 3.

Fig. 7 is an enlarged top plan view of the front end of the beet top gripping conveyors.

Fig. 8 is a fragmentary longitudinal sectional view on line 8—8 of Fig. 7.

Figures 1, 9:
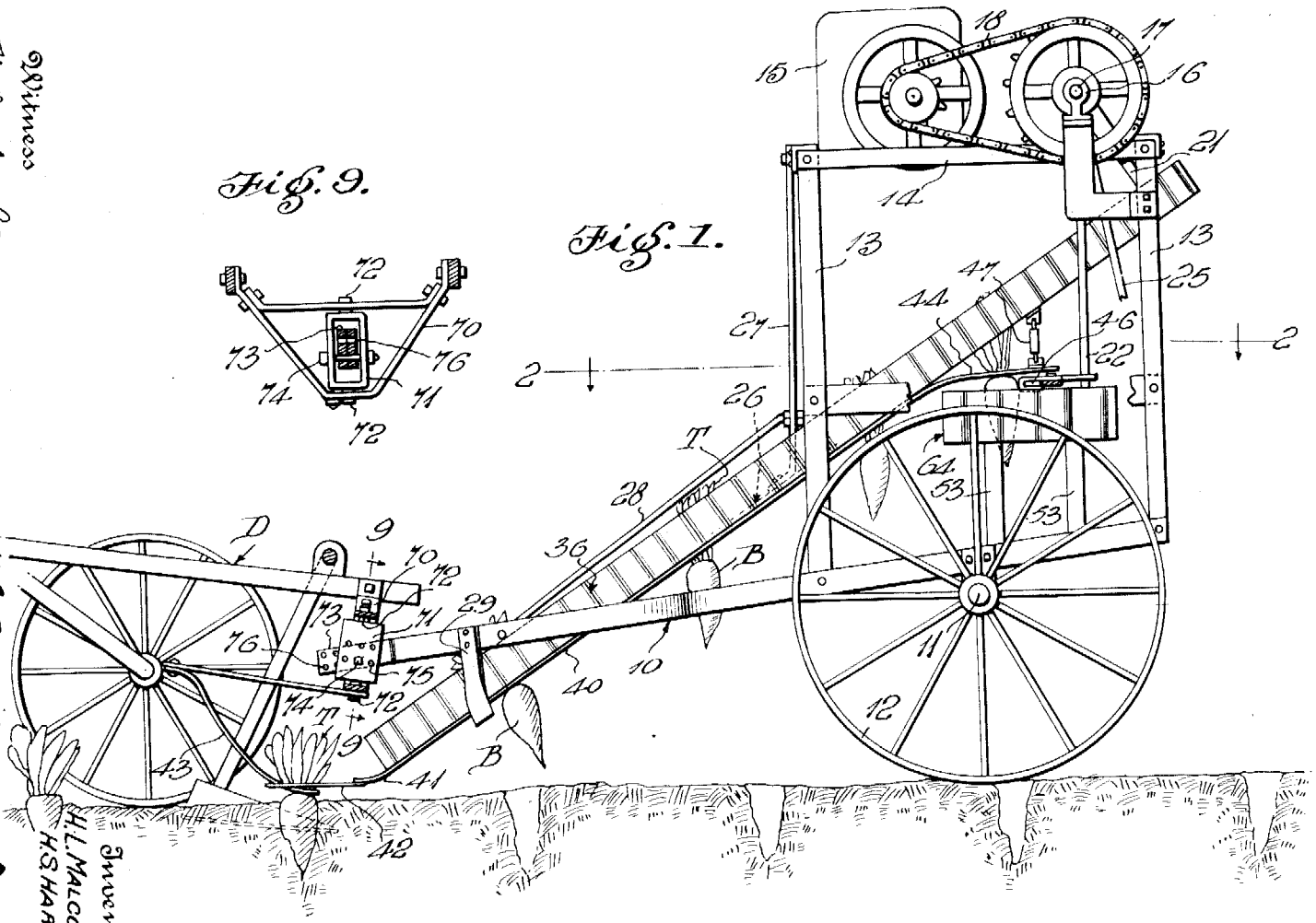
Fig. 1 is a side elevation partly broken away and in section, showing the beet lifting and topping "trailer" operatively connected with a conventional beet digger.
Fig. 9 is a detail transverse sectional view on line 9—9 of Fig. 1 showing the connecting means between the digger and the "trailer".

A preferred construction has been illustrated and will be rather specifically described, with the understanding however that within the scope of the invention as claimed, numerous variations may be made.

The frame structure as a whole, for the "trailer" is denoted at 10, said frame structure being provided with an axle 11 having ground wheels 12. In the present showing, four standards 13 are embodied in the rear portion of the frame 10, said standards carrying an upper horizontal frame 14 which may support a gas engine 15, unless movable parts of the machine are to be driven from the ground wheels 12. In the present disclosure, the frame 14 is provided with bearings 16 for a horizontal shaft 17 which is driven by appropriate means 18 from the engine 15, and said frame 14 also carries two inclined bearings 19 and two vertical bearings 20 for shafts 21 and 22 respectively, which drive the above mentioned conveyors, said shafts 21 and 22 being all driven from the shaft 17, by means of bevel gears or the like 23. Additional bevel gearing 24 is employed for utilizing the shaft 17 to drive a substantially vertical shaft 25 in one direction or the other, and this shaft 25 is employed to drive conveying means for discharging the beets and possibly the tops also, laterally of the machine. As the conveying means constitutes a separate invention from the remainder of the machine however, it has been omitted from the present disclosure.

In addition to features above described, the frame 10 embodies two forwardly declined, parallel, frame members or bars 26 whose intermediate portions are secured to hangers 27, the upper ends of said hangers being secured to the frame 14, said hangers being connected with appropriate parts of the frame 10 by brace rods 28. Additional hangers 29 are provided for the front ends of the bars 26, holding the latter in rigid relation with other parts of the frame. At the front ends of the bars 26, sprockets 30 are mounted on plates 31 for forward and rearward adjustments, and at the rear ends of said bars 26, sprockets 32 are provided, these sprockets 32 being secured to the lower ends of the shafts 21. Endless sprocket chains 33 are trained around the front sprockets 30 and the rear sprockets 32, and their inner and outer reaches are guided by appropriate rollers 34 and sprockets 35 mounted on the bars 26, the sprockets serving also to hold said reaches against sagging.

Endless beet top gripping belts 36 of yieldable nature, circumscribe the sprocket chains 33 respectively, and are preferably formed from conventional rubber and fabric belting. This belting is distorted into wave form, the crests of the waves being denoted at 37 and the troughs at 38. The wave crests 37 of each belt mesh constantly with the wave troughs 38 of the other belt, and sufficient space exists between the two belts to prevent unnecessary injury to the beet tops when they are gripped between said belts, the space being insufficient however to allow dropping of the beets from the belts. The pressure with which the beet tops are held however, is sufficiently weak so that said beet tops can slide downwardly between said belts when required, incident to positioning of the beets and presentation thereof to the cutting means. The outer sides of all of the troughs of the belts 36 are secured to the chains 33 by rivets 39 or other desired fasteners, and it will be observed that said chains are disposed midway between the upper and lower edges of the belts, giving the latter quite an amount of leeway for lateral yielding.

Secured longitudinally against the lower sides of the bars 26, are two metal strips 40 which overlie the beets B while the belts 36 are gripping the beet tops T and conveying them rearwardly as in Fig. 1. The front ends of the strips 40 curve upwardly somewhat as denoted at 41 and the inner edges of these upwardly curved ends, preferably diverge as shown. Secured to the ends 41 are two forwardly diverging rods 42 which serve to condense the beet tops T transversely of the row and to guide them between the strips 40 and the belts 36. Disposed centrally between the rods 42 is a resilient rod 43 which declines rearwardly and is preferably curved as seen in Fig. 1. This rod 43 is secured in any preferred way to the beet digger D and it serves to depress any of the loosened beets which stand too high to otherwise pass under the strips 40 and the belts 36. The rear ends of the strips 40 are bent downwardly and disposed in rearwardly diverging relation with the lower edges of the belts 36, to provide longitudinal tracks 44 which are adapted to abut the upper ends of the beets B, no matter how far said ends may be below the strips 40, thereby disposing all of said beet ends at the same elevation as they are slid rearwardly along said tracks. By thus positioning all of the beets with their upper ends at a uniform elevation, any desired amount of said upper ends may be sheared from the beets with the tops T. We have shown a reciprocatory cutter 46 under the tracks 44, and turn buckles or the like 47 are employed to vertically adjust said tracks so that more or less of the upper end of the beet may be removed with the top. It may here be stated, in passing that Fig. 1 discloses an extreme upward adjustment of the tracks 44, solely for purposes of illustration.

The cutter 46, while preferably of the reciprocatory type shown, could well be of some other appropriate design. In the present illustration, this cutter is connected with a pitman 48 which is actuated by an eccentric 49 on a vertical shaft 50 mounted in appropriate bearings 51 on one of the standards 13, said shaft 50 being driven by beveled gearing or the like 52 from the counter shaft 17.

Figure 2:
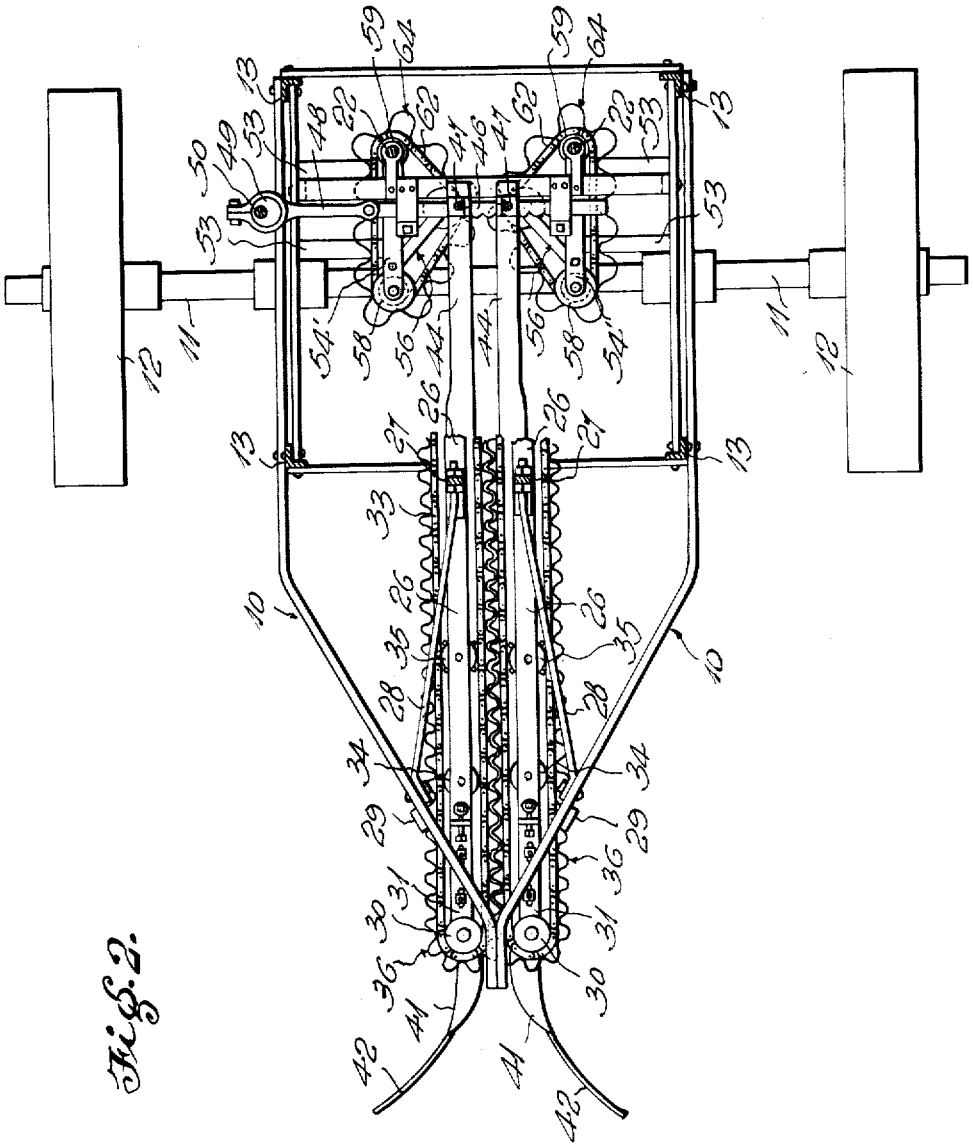
Fig. 2 is a top plan view of the "trailer" partly in horizontal section on line 2—2 of Fig. 1.
Figure 3:
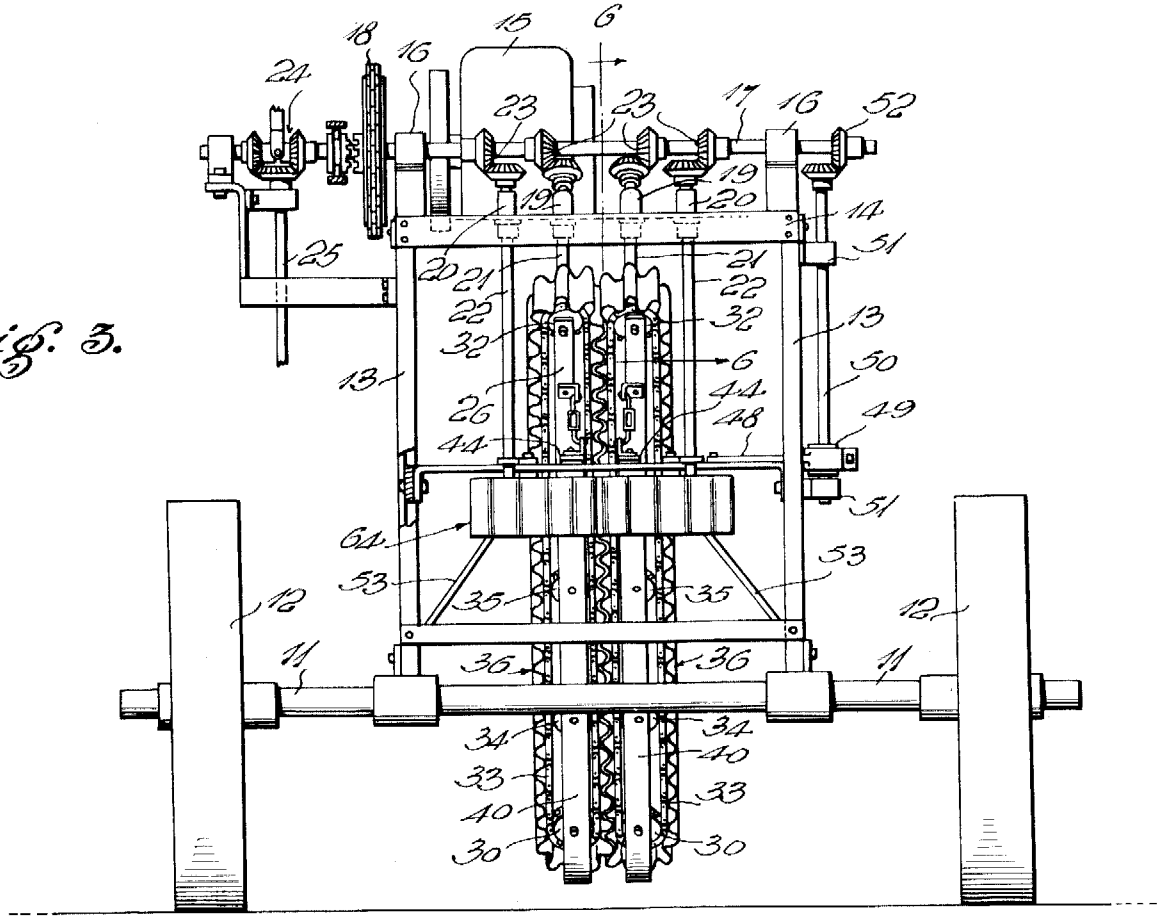
Fig. 3 is a rear end view.

Transverse frame members 53 are suitably mounted in downwardly spaced relation with the tracks 44 and cutter 46, and two longitudinal frame bars 54 (Figs. 4 and 5) are supported horizontally upon said frame members 53, the rear ends of said bars 54 being provided with bearings 55 for the lower ends of the shafts 22 above described. Similar bars 54' are disposed longitudinally above the bars 54 and are rigidly connected therewith by appropriate spacing means. Disposed horizontally between each bar 54 and the superposed bar 54' are upper and lower V-shaped frames 56 and 56' respectively, said frames being pivotally mounted at their angles, upon a tie-bolt or spacer 57 which extends between said bars. Mounted between the bars 54 and 54', near the ends of said bars are a front chain-guiding wheel 58 and a rear wheel 59, the latter being in the form of a sprocket secured to shaft 22. A third chain-guiding wheel 60 is mounted between two of the arms of the frames 56 and 56', and a fourth chain-guiding wheel 61 is mounted between the other arms of said frames. A sprocket chain 62 is trained around the various wheels 58, 59, 60 and 61, and the wheels 58, 59 and 60 hold said chain in triangular form under normal circumstances, as seen in Figs. 2 and 4, appropriate spring means 63 being employed to normally swing the frames 56 and 56' into the proper relation with the bars 54 and 54', to obtain said triangular positioning of the chain 62. These springs however allow such swinging of the frames 56 and 56' as to allow the wheel 60 and the chain portion passing around the same, to move inwardly toward the bars 54 and 54', and when this takes place the wheel 61 moves outwardly away from said bars, thus preventing slack in the chain.

A belt 64 circumscribes the chain 62 and may be formed from the same material as the belts 36, with the exception that a heavier and stiffer belting is used. Belt 64, sometimes called a butter belt, is formed of conventional belting and this belting is distorted into wave form, the crests of the waves being denoted at 65 and the troughs at 66, the outer sides of said troughs being secured at 67 to the chain 62.

There are, as seen in Fig. 2, two of the assemblages detailed in Figs. 4 and 5, said assemblages being driven by the shafts 22, insofar as the chains 62 and belts 64 are concerned. These assemblages are located directly under the positioning tracks 44, so that when the beets abut said tracks, the two belts 64 may yieldably grip said beets, the troughs 66 of said belts being in opposed relation to receive the beets. These belts rearwardly slide the beets B along the tracks 44, past the cutter 46, causing the latter to sever the tops T and the immediately adjacent upper ends of the beets therefrom. As the belts 36 continue to move upwardly and rearwardly and the beets B must travel horizontally under the tracks 44, it will be noted that the tops T must slide downwardly with respect to said belts 36. This is permitted however, without injury to the beet tops, due to the yieldable construction of said belts 36. The topped beets are discharged from the rear ends of the belts 64 and the tops T leave the belts 36 at the upper ends of the latter, and any desired conveying means (not shown) may be employed for carrying the beets and the tops laterally or otherwise.

For connecting the "trailer" carrying the beet-lifting and topping mechanism with the digger D, we prefer to use the construction shown in Figs. 1 and 9. A fixed transverse frame 70, disposed in a substantially vertical plane, is rigidly secured to the frame of the digger D, and a vertically elongated frame or yoke 71 is disposed within said frame 70 and is pivoted to the latter by vertical trunnions 72 at its upper and lower ends. The frame 70 is provided with a forwardly projecting draught portion 73 which passes through the frame or yoke 71 and is connected with the latter by a transverse horizontal bolt 74. Spaced openings 75 are provided in the yoke or frame 71, and other spaced openings 76 are formed through the draught portion 73, and the bolt 74 may be passed through any of the openings, thereby affording relative longitudinal adjustment of the "trailer" and the digger and also affording vertical adjustments. The bolt 74 acts as a pivot when raising or lowering the frame of the digger D and the connected end of the "trailer" and during passage of the two machines over uneven ground. The trunnions 72 allow relative turning of the two machines when they are being turned around at the ends of the field or when rounding turns of any kind.

While the general operation of the machine might be understood from the preceding description, it may be briefly stated as follows. As the machine advances astride a row of beets, the digger D loosens said beets in the ground and lifts them somewhat, then dropping the beets and the loosened earth and leaving the beets standing more or less vertically. The rods 42 transversely condense the beet tops T and any beets standing sufficiently high are engaged by the rod 43 and depressed so that they may pass under the curved ends 41 of the strips 40. The conveyor belts 36 yieldably grip the tops T and hence the beets are carried upwardly and rearwardly, suspended by means of their tops, as seen in Fig. 1. Regardless of the distance which any beet may project below the strips 40, said beets will abut the tracks 44 at one point or another along the length of the latter, and about the time such abutting takes place, the belts 64 yieldably but firmly grip the beets, position them vertically, and slide them rearwardly along the tracks 44 while the tops T are still held and rearwardly moved by the belts 36. As the beets in so moving, travel about horizontally whereas the belts 36 are inclined, it will be seen that the tops T must slide downwardly with respect to said belts, but this is readily permitted by the yieldable nature and the slight spacing of said belts. By means of the turn buckles 47, the tracks 44 are vertically adjusted into proper relation with the cutter 46 to cause the latter to sever more or less of the beet with the top, and as the beets are successively forced against and past the cutter 46 by the belts 64, each cutting operation will be cleanly performed. The topped beets are discharged from the belts 64 and the beet tops from the belts 36, and any appropriate conveying means or other provision may be employed for receiving the tops and beets. Due to the novel yielding mounting means for the belts 64, the inner reaches of the latter may spread to any required extent, according to the size of any beet gripped thereby. The spring means 63 insure that when no beet is between the two belts 64, the inner reaches of the latter shall be very close to each other in readiness to grip a very small beet, should the next one to arrive be small. If the beet be of greater than minimum size however, the inner reaches of the belts 64 will spread to the required extent, the frames 56 and 56′ then swinging outwardly against the action of the spring means 63. During such outward swinging, the wheels 61 prevent slack in the chains 62 and the belts 64, which would otherwise be caused by inward movement of the wheels 60.

Due to the excellent results which have been obtained from the general structure herein disclosed, such structure is preferably followed. However, attention is again invited to the fact that within the scope of the invention as claimed, numerous variations may be made.

We claim:—

1. In a beet harvester, a portable frame, two endless beet top grippers and conveyors mounted longitudinally on said frame and declining forwardly, means at the front ends of said top grippers and conveyors for guiding the tops of loosened beets between them, means at said front ends of said top grippers and conveyors for depressing any of the loosened beets which would not otherwise pass under said top grippers and conveyors, two stationary beet-positioning tracks extending longitudinally under the rear portions of said top grippers and conveyors and diverging rearwardly from the lower edges thereof, said tracks serving to abut the upper ends of the beets to dispose the latter at a uniform elevation preparatory to cutting the tops therefrom, two short yieldable endless beet grippers and conveyors mounted under said tracks and adapted to rearwardly slide the beets along said tracks after the beets abut the tracks, and means for driving said endless beet top grippers and conveyors, and said endless beet grippers and conveyors.

2. In a beet harvester, a portable frame embodying two forwardly declined frame members, two endless yieldable beet top gripping and conveying belts extending longitudinally of said frame members and each distorted into wave form, the wave crests of each belt being meshed with the wave troughs of the other belt, endless means mounted longitudinally on said frame members and secured to the inner sides of said belts to maintain the wave form of the latter, means at the front ends of said frame members for guiding the tops of loosened beets between said belts, means at said front ends of said frame members for depressing any of the loosened beets which would not otherwise pass under said belts, two stationary beet-positioning tracks extending longitudinally under the rear portions of said belts, but diverging rearwardly from the lower edges of the belts, said tracks serving to abut the upper ends of the beets to dispose the latter at a uniform elevation preparatory to cutting the tops therefrom, two short endless yieldable beet-gripping and conveying belts under said tracks and each distorted into wave form, the wave troughs of said beet-gripping and conveying belts being in opposed relation to receive and grip the beets without injury, said beet-gripping and conveying belts being adapted to rearwardly slide the beets along said tracks after the beets abut said tracks, additional endless means secured to the inner sides of said beet-gripping and conveying belts for maintaining the wave form thereof, and means for driving all of the aforesaid endless means.

3. In a beet harvester of the type embodying beet-loosening plows and two forwardly declined conveyors adapted to grip the tops of loosened beets while the latter stand in the ground and to convey the beets rearwardly; means spaced behind said plows and disposed in advance of said conveyors for depressing into the ground any of the loosened beets which would not otherwise pass under said conveyors.

4. In a beet harvester of the type embodying two forwardly declined conveyors adapted to grip the tops of loosened beets and thereby convey the beets rearwardly; a rod disposed centrally of the machine and having a rearwardly declined end which extends toward the front ends of said conveyors, said rod being adapted to slide upon and depress any of the loosened beets which would not otherwise pass under said conveyors.

5. In a beet harvester, two longitudinal forwardly declined endless beet top gripping and conveying belts each formed of conventional belting distorted into wave form, the wave crests of each belt being meshed with the wave troughs of the other belt, endless means secured to the outer sides of said wave troughs of said belts for maintaining said wave form, and mounting and driving means for said endless means.

6. In a beet harvester, a frame, two forwardly declined beet top gripping conveyors mounted on said frame, two flat strips extending longitudinally under the inner reaches of said conveyors and adapted to overlie the beets as the latter are rearwardly conveyed, the front ends of said strips being curved upwardly, the rear ends of said strips being bent downwardly into rearwardly diverging relation with said conveyors to provide beet-positioning tracks, said tracks being adapted to abut the upper ends of the beets to dispose them at a uniform elevation preparatory to cutting the tops from the beets, beet-gripping conveyors mounted under said tracks and adapted to slide the beets rearwardly along the same, and driving means for all of the aforesaid conveyors.

7. In a beet harvester of the type embodying two forwardly declined conveyors which grip the tops of loosened beets and thereby convey the beets rearwardly; two stationary beet-positioning tracks extending longitudinally under the rear portions of said conveyors and diverging rearwardly from the lower edges of said conveyors, said tracks being adapted to abut the upper ends of the beets to dispose them at a uniform elevation preparatory to cutting the tops from the beets, two short beet-gripping and conveying belts under said tracks and each formed from conventional belting distorted into wave form, the wave troughs of the two belts being opposed to receive and convey the beets without injury, said belts being adapted to rearwardly slide the beets along said tracks when the beets abut said tracks, endless means secured to the outer sides of the wave troughs of said belts for maintaining said wave form, and mounting and driving means for said endless means.

8. In a beet harvester of the type embodying two forwardly declined conveyors which grip the tops of loosened beets and thereby convey the beets rearwardly; two stationary beet-positioning tracks extending longitudinally under the rear portions of said conveyors and diverging rearwardly from the lower edges of said conveyors, said tracks being adapted to abut the upper ends of the beets to dispose them at a uniform elevation preparatory to cutting the tops from the beets, two short beet-gripping and conveying belts under said tracks and each formed of conventional belting distorted into wave form, the wave troughs of the two belts being opposed to receive and convey the beets without injury, said belts being adapted to rearwardly slide the beets along said tracks when the beets abut said tracks, endless means secured to the outer sides of the wave troughs of said belts for maintaining said wave form, yieldable mounting means for said endless means urging the two belts toward each other and allowing spreading thereof according to the size of any beet received between them, and driving means for said endless means.

9. In a beet harvester, two yieldable beet-gripping and conveying belts each formed of conventional belting distorted into wave form, the wave troughs of said belts being opposed to receive and convey the beets without injury, endless means secured to the outer sides of said troughs of said belts for maintaining said wave form, and mounting and driving means for said endless means.

10. In a beet harvester, two yieldable beet gripping and conveying belts each formed of conventional belting distorted into wave form, the wave troughs of said belts being opposed to receive and convey the beets without injury, endless means secured to the outer sides of said troughs of said belts for maintaining said wave form, yieldable mounting means for said endless means urging the two belts toward each other and allowing spreading thereof according to the size of any beet gripped thereby, and driving means for said endless means.

11. An endless yieldable conveyor belt formed of conventional belting distorted into wave form, and endless means secured to the outer sides of the wave troughs of said belt to maintain said wave formation.

12. In a conveying means, an endless conveyor, three wheels around which said conveyor is trained, said wheels being positioned to normally dispose said conveyor in triangular form, stationary supporting means on which two of said wheels are mounted, a swingable frame pivoted to said supporting means and carrying the third wheel, spring means acting on said swingable frame for normally urging said third wheel outwardly but adapted to yield and allow inward movement of said third wheel, and a fourth wheel on said swingable frame engaging said conveyor and positioned to move outwardly when said third wheel moves inwardly and vice versa thereby preventing slack in the conveyor.

13. In a beet harvester, the combination of means to loosen the ground on opposite sides of a row of beets to leave them loosened in the ground in an upright position slightly above the level at which they grew, an elevating conveyor means to engage the tops of the loosened beets to pull them out of the ground, means to direct the leaves of the tops of the beets into the conveyor means, and means centrally arranged with respect to the leaf directing means to engage the crowns of any beets standing too high to depress such beets and prevent their bodies from being engaged by said conveyor means.

14. In a beet harvester, the combination of means to loosen beets in the ground, an elevating conveyor means to engage the tops of the loosened beets to pull them out of the ground, and means behind said loosening means and in advance of said conveyor means to slide upon and depress any of the loosened beets which would not otherwise pass under said conveyor means.

HENRY L. MALCOM.
HYRUM S. HARKER.